United States Patent
Sivakumar et al.

(10) Patent No.: US 11,902,826 B2
(45) Date of Patent: Feb. 13, 2024

(54) ACKNOWLEDGEMENT OF DATA PACKET TRANSMISSION USING RLC IN AM MODE OPERATING IN 5G PROTOCOL STACK WITH MITIGATION OF RLC CHANNEL CONGESTION

(71) Applicant: INTERNATIONAL BUSINESS MACHINES CORPORATION, Armonk, NY (US)

(72) Inventors: Gandhi Sivakumar, Bentleigh (AU); Kushal S. Patel, Pune (IN); Luke Peter Macura, Lucas (AU); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 17/403,988

(22) Filed: Aug. 17, 2021

(65) Prior Publication Data

US 2023/0057132 A1 Feb. 23, 2023

(51) Int. Cl.
*H04W 28/02* (2009.01)
*H04L 1/1607* (2023.01)

(52) U.S. Cl.
CPC ....... *H04W 28/0289* (2013.01); *H04L 1/1607* (2013.01)

(58) Field of Classification Search
CPC ................ H04W 28/0289; H04L 1/1607
See application file for complete search history.

(56) References Cited

U.S. PATENT DOCUMENTS

| 9,408,109 | B2 | 8/2016 | Jonsson |
| 2012/0039176 | A1 | 2/2012 | Eshan |
| 2014/0233490 | A1 | 8/2014 | Yi |

(Continued)

FOREIGN PATENT DOCUMENTS

| CA | 3080047 A1 * 11/2020 | ............ H04B 17/318 |
| CN | 112075097 A * 12/2020 | ............ H04L 1/0007 |

(Continued)

OTHER PUBLICATIONS

CATT Reliability Enhancement for PTM Transmission, 3GPP TSG RAN WG2#112-e, R2-2008792, Nov. 13, 2020, 7 pages.

(Continued)

*Primary Examiner* — Saad A. Waqas
(74) *Attorney, Agent, or Firm* — Schmeiser, Olsen & Watts, LLP; Edward Wixted

(57) ABSTRACT

A method, computer program product, and computer system for transmitting an ACK in response to receipt of a data packet in RLC AM mode operation in a 5G communication protocol stack. A first RLC entity receives from a receiving UE corresponding to the first RLC entity: (i) an ACK to be sent to a transmitting UE in response to the receiving UE having received a data packet from the transmitting UE and (ii) a first RLC channel extracted by the receiving UE from a header of the data packet. In response to a first communication having specified that the first RLC channel is congested, the first RLC entity selects a second, different RLC channel operating in the RLC AM mode and not being congested. The first RLC entity sends the ACK to the transmitting UE via the second RLC channel instead of via the first RLC channel.

20 Claims, 8 Drawing Sheets

(56) References Cited

U.S. PATENT DOCUMENTS

2020/0045766 A1    2/2020    Kim et al.
2020/0344174 A1    10/2020    Zou

FOREIGN PATENT DOCUMENTS

| | | |
|---|---|---|
| EP | 1833211 A2 | 9/2007 |
| KR | 102023539 B1 | 11/2018 |
| WO | WO-2022211340 A1 * | 10/2022 |

OTHER PUBLICATIONS

Huawei, Support of flow control for IAB network 3GPP, TSG-RAN WG3 Meeting #104, R3-192813, May 17, 2019, 3 pages.

PCT Search Report and written opinion, International application No. PCT/CN2022/107372, filed Jul. 22, 2022, dated Oct. 19, 2022, 9 pages.

Wikipedia, Rejection sampling, https://en.wikipedia.org/wiki/Rejection_sampling, 9 pages.

Wikipedia, Box plot, https://en.wikipedia.org/wiki/Box_plot, 8 pages.

Wikipedia, Kullback-Leibler divergence, https://en.wikipedia.org/wiki/Kullback%E2%80%93Leibler_divergence, 17 pages.

Mell, Peter et al.; "The NIST Definition of Cloud Computing;" National Institute of Standards and Technology; Special Publication 800-145; Sep. 2011; 7 pages.

Eventhelix, 5G NR RLC Acknowledged Mode, Oct. 5, 2019, Deep dive into the 5G Radio Link Control in Acknowledged Mode, Retrieved from Internet: https://medium.com/5g-nr/5g-nr-rlc-acknowledged-mode-a55a5dbf29c, Retrieved on Aug. 12, 2021, 25 pages.

Delia Rico et al., A Survey of End-to-End Solutions for Reliable Low-Latency Communications in 5G Networks, IEEE Access, Nov. 3, 2020, Retrieved from Internet: https://ieeexplore.ieee.org/stamp/stamp.jsp?arnumber=9234518, 27 pages.

Uplink Data Compression, 3 GPP Solutions for Enhancing the Uplink Performance, White Paper, Retrieved from Internet: https://d86o2zu8ugzlg.cloudfront.net/mediatek-craft/documents/MediaTek-UDC-White-Paper-PDFUDCWP-0718.pdf, 2018, 21 pages.

Optimizing Network Applications for 5G, Apr. 21, 2017, Retrieved from Internet: https://www.ericsson.com/en/news/2017/4/optimizing-network-applications-for-5g, Retrieved on Aug. 12, 2021, 3 pages.

Optimizing media and radio signal processing for 5G, Mar. 20, 2018, Retrieved from Internet: https://www.3gpp.org/news-events/1950-sa4, Retrieved on Aug. 12, 2021, 2 pages.

Jeremy Horwitz, Huawei's first 5G phone reportedly guzzles power, needs big heatsink, Jul. 30, 2018, Retrieved from Internet: https://venturebeat.com/2018/07/30/huaweis-first-5g-phone-reportedly-guzzles-power-needs-big-heatsink/, Retrieved on Aug. 12, 2021, 5 pages.

Karl Bode, 5 G's Latest Problem: Summer Temps Are Causing 5G Phones to Overheat, Techdirt, Jul. 17, 2019, Retrieved from Internet: https://www.techdirt.com/articles/20190715/07241342588/5gs-latest-problem-summertemps-are-causing-5g-phones-to-overheat.shtml, Retrieved on Aug. 12, 2021, 6 pages.

Joel Hruska, 5G Modems and Phones Literally Can't Handle the Heat of Summer Weather, Jul. 19, 2019, Retrieved from Internet: https://www.extremetech.com/mobile/295228-5g-modems-and-phones-literally-cant-handle-the-heat-of-summer-weather, 12 pages.

Paolo Collela, 5G and IoT: Ushering in a new era, Retrieved from Internet: https://www.ericsson.com/en/about-us/company-facts/ericsson-worldwide/india/authored-articles/5g-and-iot-ushering-in-a-new-era, Retrieved on Aug. 12, 2021, 3 pages.

5G NR Radio Protocol Stack (Layer 2 and Layer 3), Sep. 4, 2017, Retrieved from Internet: https://www.techplayon.com/5g-nr-radio-protocol-stack-layer-2-layer-3/, Retrieved on Aug. 12, 2021, 10 pages.

* cited by examiner

ACKNOWLEDGEMENT OF DATA PACKET TRANSMISSION USING RLC IN AM MODE OPERATING IN 5G PROTOCOL STACK WITH MITIGATION OF RLC CHANNEL CONGESTION

BACKGROUND

The present invention relates in general to 5G Radio Link Control (RLC) Acknowledge Mode (AM) data packet transmission and in particular to mitigation of RLC channel congestion occurring during ACK transmission for acknowledging receipt of data packets in accordance with the 5G Protocol Stack.

In the RLC Acknowledge Mode (AM) communication mode, which is the most complicated RLC communication mode, handshaking policies are mandatory for RLC-to-RLC communications. The AM mode requires transmission of ACK/NACK from the receiving entity to the transmitting entity for each packet transmitted by the transmitting entity to the receiving entity. Since the ACK/NACK is expected for each packet transmitted, a huge overhead is experienced if radio link or lower layer congestion occurs. Although the RLC window concept and the polling bit concept are used, application latency is impacted if the lower layers are congested. Additionally, various ACK/NACK scheduling mechanisms make it extremely difficult to understand full details of RLC AM operation and frequent user-kernel space interaction is needed for handling such communication modes in 5G networks, which adds complication to the 5G communication process. After the transmitting RLC performs a segmentation/concatenation process, the transmitting RLC adds a RLC header to the packet and then creates two identical copies of the packet and transmits one copy of the packet to the lower layer (e.g., Medium Access Control (MAC) layer) and sends the other copy of the packet to the retransmission buffer in the transmitting RLC. If the RLC receives a NACK or does not receive any response from the receiving party for a specified period of time, the RLC packet in the retransmission buffer, which is called a RLC Protocol Data Unit (PDU), is transmitted again to the receiving entity. If the transmitting RLC receives an ACK, then the copy of the packet in the transmitting RLC's retransmission buffer is discarded.

In AM mode transmission over a 5G network, if lower layers such as MAC or Radio Access Network (RAN) interfaces are bottlenecked, then delayed acknowledgement of the packet transmission adds additional turnaround I/O latency in the network. Additionally, as the packet is kept in the transmitting RLC's retransmission buffer until the ACK is received for a certain defined time of polling limit, consequent increased back pressure to stop sending additional packets to the receiving RLC occurs since the previous packet responses are not being received at the receiving UE. If the 5G UE is connected to Evolved Node B (eNodeB) and the MAC or RAN interface is congested, or if some of the resource congestion and overloading is at eNodeB, then the late ACK to the UE's RLC channels occurs, which may cause application latency to increase exponentially. Thus, all of the applications accessing the 5G network will stop executing, since no packets are being transmitted over the RLC channel.

In the 5G telecom network, the RLC is logically provided with multiple parallel slices that are independently connected to the eNodeB with mapped Radio interface slices to obtain benefits of 5G parallelism. With the multiple parallel slices, multiple 5G RLC channels established for end-to-end communication are mapped to different resources at logical endpoints (UEs) and eNodeBs. With the multiple parallel slices, the channel handing resources may be overloaded which results channel congestion in some RLC channels while other RLC channels could respond normally, so that an application accessing a congested RLC channel will experience I/O transmission failure while other RLC channels will function normally.

Since some RLC channels are functioning normally while other RLC channels have delay in ACK sending, there is a need to mitigate the preceding congestion occurring in some RLC channels.

The 5G Protocol Stack includes both a 5G User Plane Protocol Stack and a 5G Control Plane Protocol Stack as depicted in FIGS. 1A and 1B.

FIG. 1A depicts the 5G User Plane Protocol, in accordance with the prior art. The user plane is used for transmitting user data.

FIG. 1B depicts the 5G Control Plane Protocol Stack, in accordance with the prior art. The control plane is used for transmitting control signaling.

In the 5G User Plane Protocol and the 5G Control Plane Protocol Stack, the gNodeB (gNB) is similar to the eNodeB. The gNodeB provides a wireless interface to the UE and a wired interface with a 5G core network.

FIG. 2 depicts a 5G service flow architecture, in accordance with the prior art. The Application flow is from a UE to an Application Server as shown. Bearers in the 5G service flow architecture include: EPS Bearer between UE and S*/P* GW, External Bearer between S*/P* GW and Application Server, Radio Bearer between UE and 5G AN-O, and S1*/S5*/S8* Bearer between 5G-AN-O and S*/P* GW. A bearer is a carrier of something from one point to another point. Also depicted in FIG. 2 are a mobile device, an eNodeB, and a 5G-Core Cloud.

SUMMARY

Embodiments of the present invention provide a method, a computer program product and a computer system, for transmitting an ACK in response to receipt of a data packet in Radio Link Control (RLC) Acknowledge Mode (AM) mode operation in a 5G communication protocol Stack. A first RLC entity receives from a receiving user equipment (UE) corresponding to the first RLC entity within operation in the 5G communication protocol stack: (i) an ACK to be sent to a transmitting UE in response to the receiving UE having received a data packet from the transmitting UE, (ii) a first RLC channel extracted by the receiving UE from a header of the data packet, and (iii) an identifier (ID) of the transmitting UE extracted by the receiving UE from the header of the data packet. The receiving RLC is configured to send the ACK to the transmitting UE via the extracted first RLC channel. The first RLC entity sends a first query to an Evolved Node B (eNodeB). The first query queries the enodeB as to whether the first RLC channel is congested. The first RLC channel operates in a RLC Acknowledge Mode (AM) mode within the 5G architecture. The receiving UE and the transmitting UE are communicatively coupled to the eNodeB. After the first query is sent to the eNodeB, the first RLC entity receives a first communication from the eNodeB specifying that the first RLC channel is congested. In response to the received first communication having specified that the first RLC channel is congested, the first RLC entity selects from an AM mode RLC channel list stored at the receiving UE, a second, different RLC channel: (i) operating in the RLC AM mode, (ii) corresponding to the extracted ID of the transmitting UE, and (iii) specified as not being congested in a second communication received by the receiving RLC from the eNodeB in response to a second query sent by the second RLC to the eNodeB as to whether the second RLC channel is congested. The first RLC entity sends the ACK to the transmitting UE via the second RLC channel instead of via the first RLC channel.

DETAILED DESCRIPTION

Figure 1A:
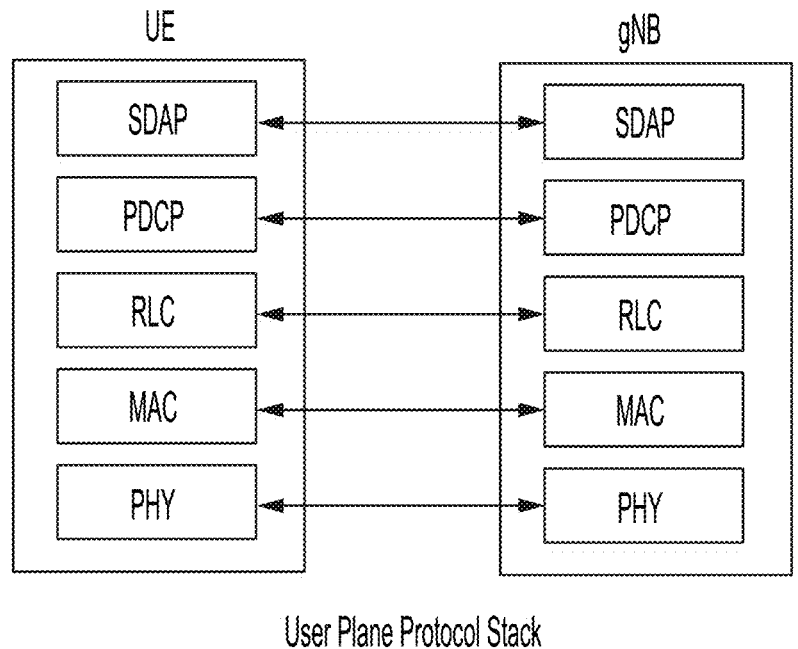
FIG. 1A depicts the 5G User Plane Protocol, in accordance with the prior art.
Figure 1B:
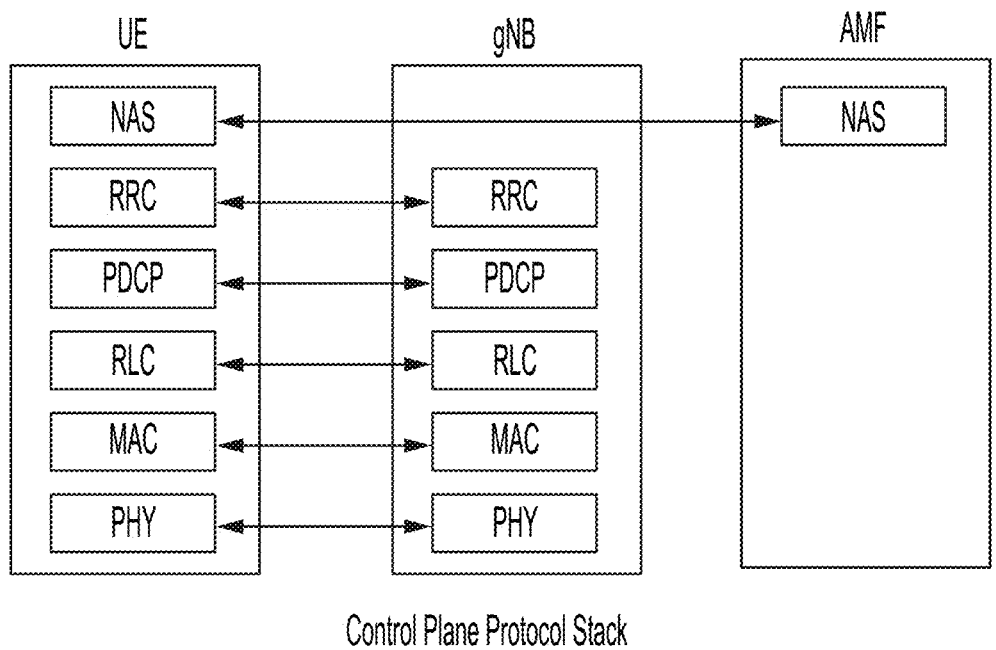
FIG. 1B depicts the 5G Control Plane Protocol Stack, in accordance with the prior art.
Figure 2:
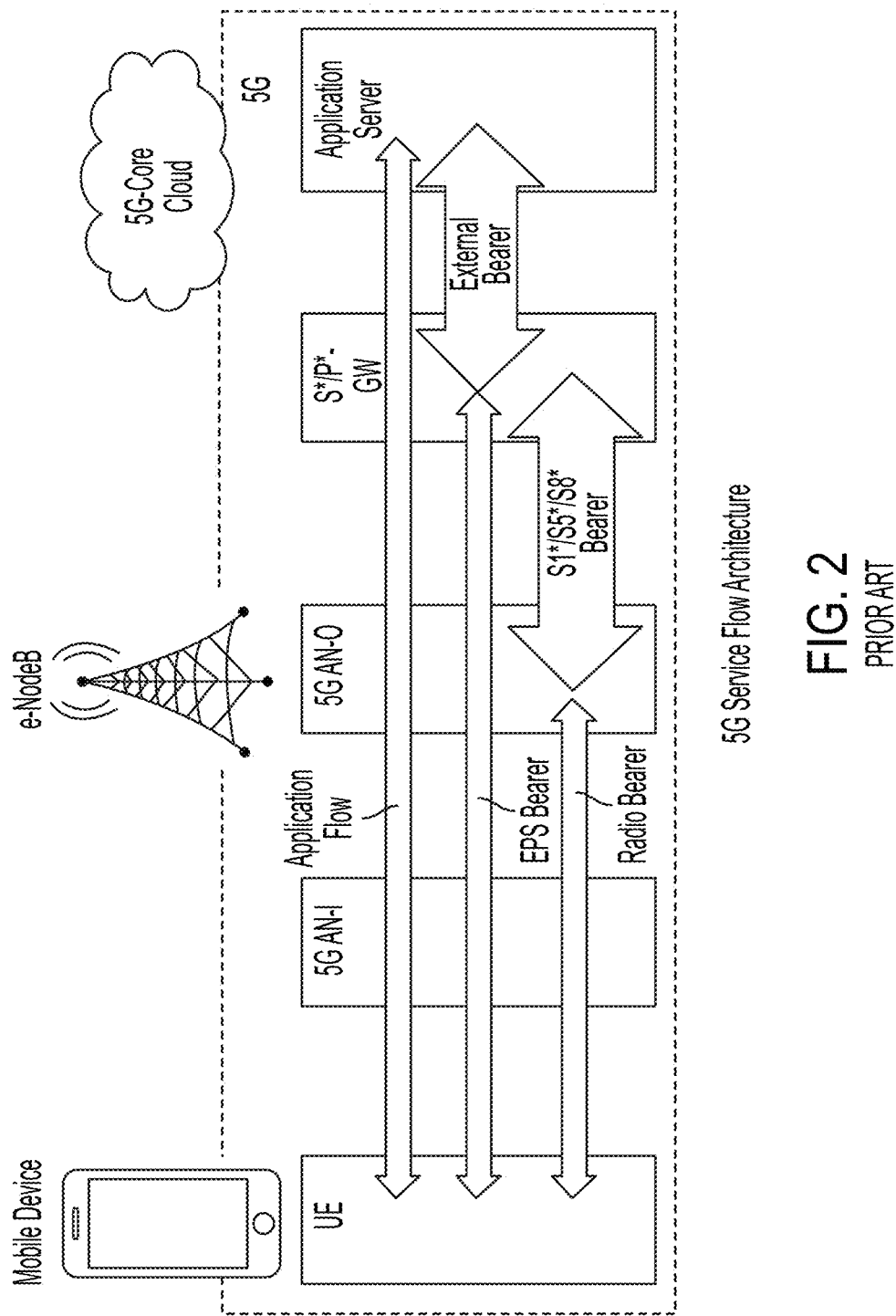
FIG. 2 depicts a 5G service flow architecture, in accordance with the prior art.

Advancements in the telecommunication industry has been a key enabler for many technologies including Artificial Intelligence (AI) to succeed by breaking the barrier of various factors such as sedentary operations, lower bandwidth etc. The 5G technology is expected to serve as a rich enabler for pushing the dependent technologies to even much higher levels through mobility bandwidth of 1 GBPS, convergence of Internet of Things (IoT) device access, etc. The 5G network is expected to become increasingly useful through various features including observing the surroundings, reasoning, inferring and making decisions, etc. In a 5G telecom network, the Medium Access Control (MAC) layer of New Radio (NR) provides services to the Radio Link Control (RLC) layer controls in the form of logical channels. These logical channels are virtualized communication network interfaces used to transfer I/O commands pertaining to network data packets and control instructions over a radio interface and a 5G fixed access network. A logical channel is defined by the type of information the logical channel carries and is generally differentiated as a control channel used for transmission of control and configuration information; or as a traffic channel used for the user data. 5G NR technology allows creation of multiple logical channels over a single radio bearer network using 5G network slicing models. The logical channels are used to carry specialized traffic from a User Equipment (UE) device to the 5G network. Since multiple channels are created from a single device to the 5G network, the multiple channels deliver parallelism in packet transmission and also reduce the exclusive locking of the 5G network resources, which provides performance benefits.

Embodiments of the present invention perform actions with respect to the RLC layer of the 5G communication protocol stack and provide a way to effectively handle AM mode communication in consideration of lower level resource congestion (e.g., at the at the Medium Access Control (MAC) layer). A data packet is sent from a transmitting User Equipment (UE) to a receiving UE. A UE is a device (e.g., cell phone, laptop computer, etc.) used directly by an end-user to communicate. A "first RLC entity" performs operations at the RLC layer ("first RLC layer") associated with the receiving UE. A "second RLC entity" performs operations at the RLC layer ("second RLC layer") associated with a transmitting UE that transmits a data packet to the receiving UE. In one embodiment, each RLC entity of the first RLC entity and the second RLC entity includes a RLC Controller.

Information is collected from each RLC layer's channel management unit for the current RLC active mode for a RLC channel. If the current RLC active node is detected as AM mode, then the first RLC entity (e.g., the RLC controller at the first RLC layer) collects all RLC channels having active AM mode tuning for communication exchanged between entities. The first RLC entity collects, from the Evolved Node B (eNodeB) radio resource, information regarding congestion and overloading status of the eNodeB and accordingly provides a trigger to ta inter-bearer ACK handshake and transmission engine at the first RLC layer.

An instance is running at each RLC layer of each endpoint (i.e., the endpoints of the first RLC layer associated with the receiving UE and the second RLC layer associated the transmitting UE) in the 5G network. With normal operation, the RLC retransmission timers and ACK timers at the second RLC layer of the transmitting UE poll for the receipt of packet delivery at the receiving UE. When the packet is delivered at the receiving UE, an ACK will be sent from the receiving UE to the transmitting UE to acknowledge receipt of the data packet at the receiving UE.

If the lower layer resources are detected as being bottlenecked or overloaded, then in normal operation the ACKs are queued at the eNodeB. Even if the eNodeB received the data packet from the initiator (i.e., the transmitting UE), the second RLC entity retransmits the data packet to the receiving UE since the ACK is not received at the transmitting UE. Thus, instead of holding and queuing the ACK at eNodeB, the ACK is sent to the transmitting UE via another RLC channel. A demon instance at the eNodeB detects a RLC channel congestion state by a resource polling thread running at the MAC and Radio Access Network (RAN) physical interfaces. If the RLC channels are detected with congestion, then the ACK messages queued at the eNodeB are detected. An ACK threshold for the queued ACKs is employed with respect to how many ACKs are queued. If a total number of ACKs queued exceeds the ACK threshold, then the instance of inter-RLC data transmission at the first RLC layer is activated.

The RLC channels having a same initiator identity of the transmitting UE are utilized to ensure that the ACK for the received data packet will reach the same initiator. Additionally, if application specific channels are created, then the application identity is extracted from the header of the data packet to maintain privacy and security constraints and the new RLC channels are located. The ACK for the RLC channel identified in the header of the data packet will be transferred to a newly selected non-congested RLC channel for transmission of the ACK to the transmitting UE. Accordingly, the ACK will be sent to the transmitting UE via the newly selected non-congested RLC channel.

At the instance of the receiving UE, the service in the first RLC layer checks the retransmission buffer in each RLC channel for the packet status with respect to threshold policies at the initiator level of the transmitting UE. If there are more packets than a threshold number of packets detected in the retransmission buffer of the transmitting UE, then it is likely that the eNodeB resources are bottlenecked because of which the ACKs are not being received for AM mode transmission, which triggers activation of an inter-channel consumer program at the receiving UE to obtain ACK information of all ACKs coming from lower layer MAC services. The obtained ACK information is provided to the MAC layer which will enable no-ACK-drop for other channels. An ACK for a data packet received at the receiving UE will be supplied to the first RLC layer at the receiving UE and then the first UE extracts the RLC channel from the packet header of the data packet using a header decoder. The extracted RLC channel is supplied by the first UE to the inter-RLC engine at the first RLC layer.

In addition, the first UE entity extracts an identifier (ID) of the transmitting UE from the packet header of the data packet in order to send the ACK to the correct packet initiator on another RLC channel that is not congested and is a different RLC channel than the extracted RLC channel that is congested. Thus, the conventional packet retransmission is avoided since the ACK is being received on another RLC channel that is not congested, thereby saving the application latency and allowing upper layer applications to work normally in cases of remote resource congestion in the 5G network. Accordingly, the present invention identifies non-congested RLC channels and implements sending ACKs for AM mode transmission via the identified non-congested channels. Since ACK frames have no data, native 5G security policies are not violated and can be implemented to gain performance benefits in contrast with conventional ACK processing.

Figure 3:
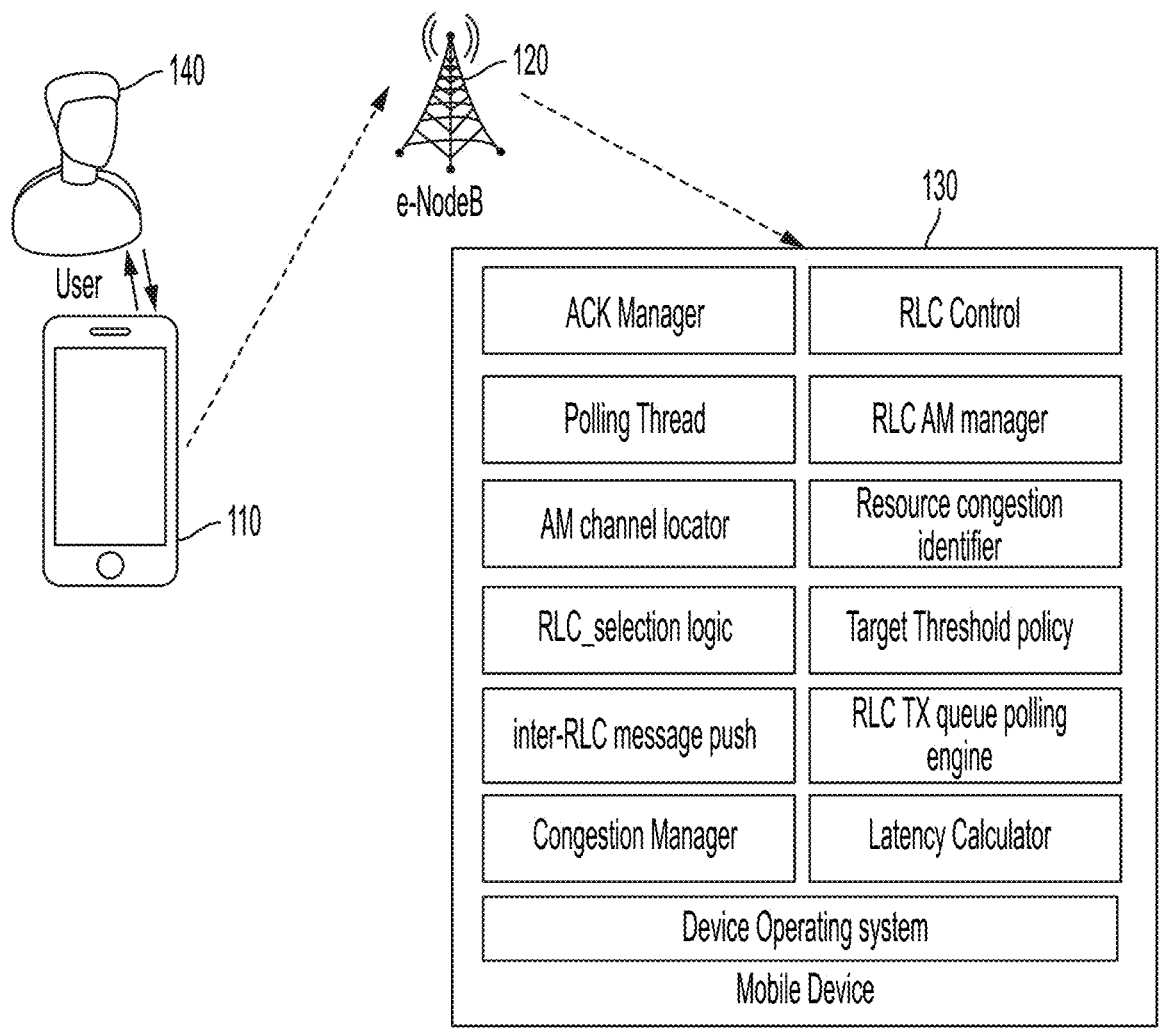
FIG. 3 depicts a transmitting User Equipment (UE) in communication with a receiving EU via an Evolved Node B (eNodeB), in accordance with embodiments of the present invention.

FIG. 3 depicts a transmitting UE 110 in communication with a receiving EU 130 via an eNodeB 120, in accordance with embodiments of the present invention. A user 140 is using the UE 110. Illustratively, the receiving UE 130 may be a mobile device as shown. In one embodiment, the mobile device 130 may include one or more of: a device operating system, an ACK manager, a polling thread, an AM channel locator, RLC selection logic, an inter-RLC message push, a congestion manager, RLC control, a RLC AM manager, a resource congestion identifier, a target threshold policy, a RLC TX queue polling engine, and a latency calculator.

Figure 4:
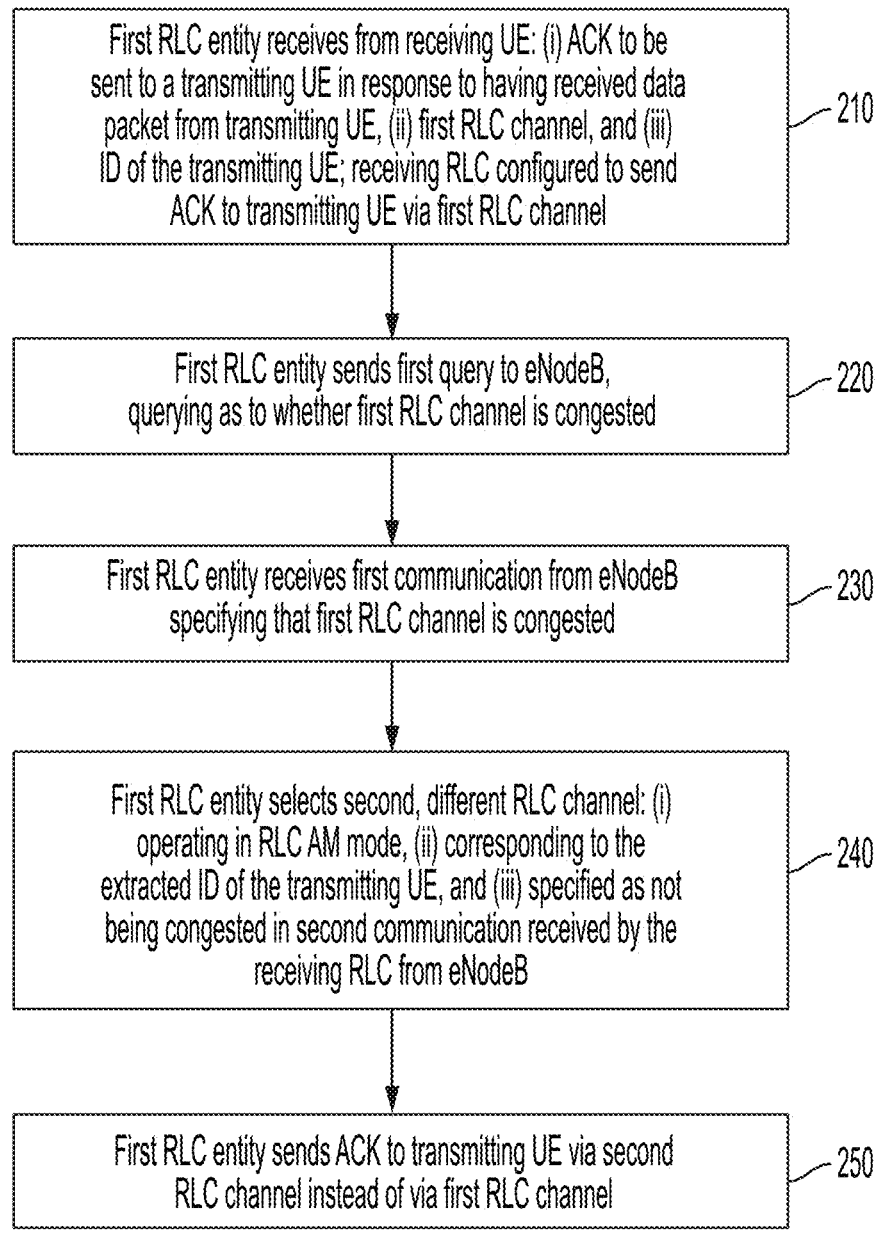
FIG. 4 is a flow chart describing a method for transmitting an ACK in response to receipt of a data packet in Radio Link Control (RLC) Acknowledge Mode (AM) mode operation in a 5G communication protocol stack, in accordance with embodiments of the present invention.

FIG. 4 is a flow chart describing a method for transmitting an ACK in response to receipt of a data packet in Radio Link Control (RLC) Acknowledge Mode (AM) mode operation in a 5G communication protocol stack, in accordance with embodiments of the present invention. The flow chart of FIG. 4 includes steps 210-250.

Step 210 receives, by a first RLC entity from a receiving user equipment (UE) corresponding to the first RLC entity within operation in the 5G communication protocol stack: (i) an ACK to be sent to a transmitting UE in response to the receiving UE having received a data packet from the transmitting UE, (ii) a first RLC channel extracted by the receiving UE from a header of the data packet, and (iii) an identifier (ID) of the transmitting UE extracted by the receiving UE from the header of the data packet, said receiving RLC configured to send the ACK to the transmitting UE via the extracted first RLC channel.

Step 220 sends, by the first RLC entity, a first query to an eNodeB. The first query queries the enodeB as to whether the first RLC channel is congested. The first RLC channel operates in a RLC AM mode within the 5G architecture. The receiving UE and the transmitting UE are communicatively coupled to the eNodeB.

After the first query is sent to the eNodeB, step 230 receives, by the first RLC entity, a first communication from the eNodeB specifying that the first RLC channel is congested.

In response to the received first communication having specified that the first RLC channel is congested, step 240 selects, by the first RLC entity from an AM mode RLC channel list stored at the receiving UE, a second, different RLC channel: (i) operating in the RLC AM mode, (ii) corresponding to the extracted ID of the transmitting UE, and (iii) specified as not being congested in a second communication received by the receiving RLC from the eNodeB in response to a second query sent by the second RLC to the eNodeB as to whether the second RLC channel is congested.

In step 250, the first RLC entity sends the ACK to the transmitting UE via the second RLC channel instead of via the first RLC channel.

Figure 5:
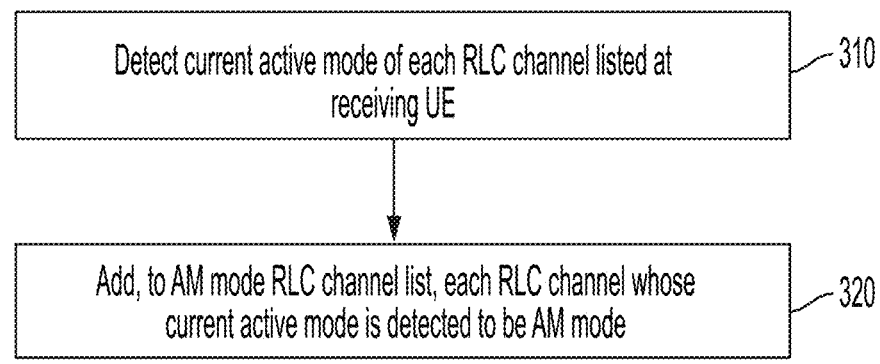
FIG. 5 is a flow chart describing a process by which the first RLC entity generates the AM mode RLC channel list, in accordance with embodiments of the present invention.

FIG. 5 is a flow chart describing a process by which the first RLC entity generates the AM mode RLC channel list, in accordance with embodiments of the present invention. The process of FIG. 5 includes steps 310-320.

Step 310 detects a current active mode of each RLC channel listed at the receiving UE. In one embodiment, detecting the current active mode of each RLC channel comprises collecting each RLC channel's current active mode for each Detailed Traffic Channel (DTCH) connected to the eNodeB. A DTCH is a point-to-point channel dedicated to one UE for transfer of user information.

Step 320 adds, to the AM mode RLC channel list, each RLC channel whose current active mode is detected to be the AM mode.

In one embodiment, the first RLC channel is congested due to at least one interface of a Medium Access Control (MAC) physical interface and a Radio Access Network (RAN) interface being bottlenecked with resource congestion, as detected by a first polling thread running at the MAC interface and second polling thread running at the RAN interface.

In one embodiment, the data packet was sent to the receiving UE by an application at the transmitting UE, wherein the second RLC channel is specific to the application. In one embodiment, an identity of the application is extracted from the header of the data packet to maintain privacy and security constraints pertaining to the application In one embodiment, the first RLC entity detects a mode of the RLC channel being the AM mode and in response, the first RLC entity collects all RLC channels having active AM mode tuning for communication exchanged between the first UE and the second UE.

In one embodiment, the first RLC entity and the second RLC entity each include a RLC controller. In one embodiment, the RLC controller includes one or more of: a threshold manager, a packet extractor, a memory allocator, an ACK manager, a RLC channel identifier, a retransmission buffer manager, an inter-channel RLC handler, a congestion detector, and an AM mode manager.

In one embodiment, the present invention handles Radio link transmission over New Radio technology with intelligent packet data processing and reduces application packet transmission latency for critical application traffic at UE for conditional users.

In one embodiment, since UE's applications are the most visible endpoints of a 5G network, application performance will be saved in cases of RLC channel congestion and resource overload situations at the network eNodeB interfaces, which delivers better user experience for the user applications.

In one embodiment, multiple eNodeBs can be virtualized to perform intercarrier transmission of ACK and gain additional performance benefits.

In one embodiment, enqueued ACK handing for AM mode RLC slices is reduced.

In one embodiment, the packets are selected intelligently to avoid application impact of RLC processing.

In one embodiment, better application to network packet transmission latency is provided, resulting in achievement of better user experience in cases of 5G resource congestion.

In one embodiment, the present invention deals with 5G infrastructure and resource management and optimization, so that manufacturers of personal and embedded devices are enabled to provide more efficient monitoring of resources, which reduces non-related content and provides a capability to dynamically control content delivery.

The methods of the present invention mechanism cannot be implemented in 3G/4G LTE mechanisms. Hence, the present invention is a pure 5G invention.

Figure 6:
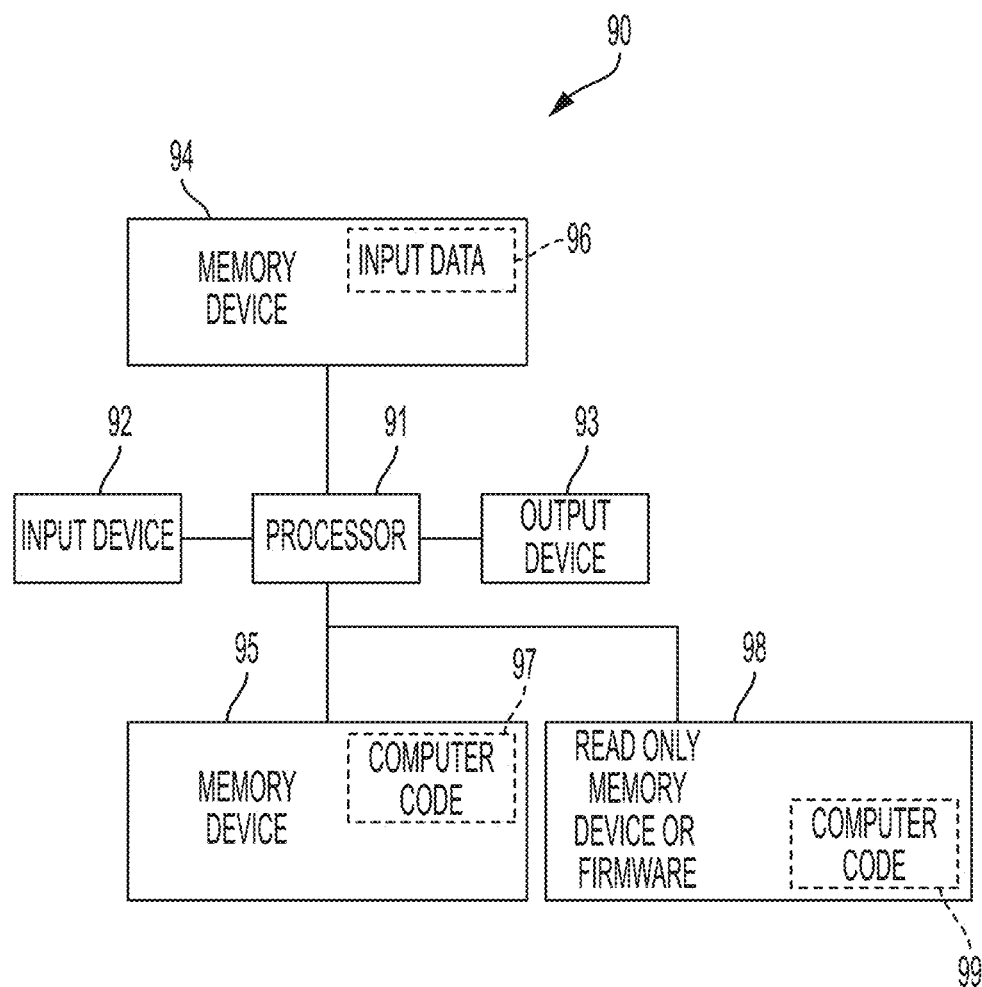
FIG. 6 illustrates a computer system, in accordance with embodiments of the present invention.

FIG. 6 illustrates a computer system 90, in accordance with embodiments of the present invention.

The computer system 90 includes a processor 91, an input device 92 coupled to the processor 91, an output device 93 coupled to the processor 91, and memory devices 94 and 95 each coupled to the processor 91. The processor 91 represents one or more processors and may denote a single processor or a plurality of processors. The input device 92 may be, inter alia, a keyboard, a mouse, a camera, a touchscreen, etc., or a combination thereof. The output device 93 may be, inter alia, a printer, a plotter, a computer screen, a magnetic tape, a removable hard disk, a floppy disk, etc., or a combination thereof. The memory devices 94 and 95 may each be, inter alia, a hard disk, a floppy disk, a magnetic tape, an optical storage such as a compact disc (CD) or a digital video disc (DVD), a dynamic random access memory (DRAM), a read-only memory (ROM), etc., or a combination thereof. The memory device 95 includes a computer code 97. The computer code 97 includes algorithms for executing embodiments of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 96) may include algorithms and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 98 (e.g., including algorithms) may be stored on a static, nonremovable, read-only storage medium such as a Read-Only Memory (ROM) device 99, or may be accessed by processor 91 directly from such a static, nonremovable, read-only medium 99. Similarly, in some embodiments, stored computer program code 97 may be stored as computer-readable firmware 99, or may be accessed by processor 91 directly from such firmware 99, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software technology associated with cross-referencing metrics associated with plug-in components, generating software code modules, and enabling operational functionality of target cloud components. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software technology associated with cross-referencing metrics associated with plug-in components, generating software code modules, and enabling operational functionality of target cloud components. In another embodiment, the invention provides a business method that performs the process steps of the invention on a subscription, advertising, and/or fee basis. That is, a service supplier, such as a Solution Integrator, could offer to enable a process for improving software technology associated with cross-referencing metrics associated with plug-in components, generating software code modules, and enabling operational functionality of target cloud components. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
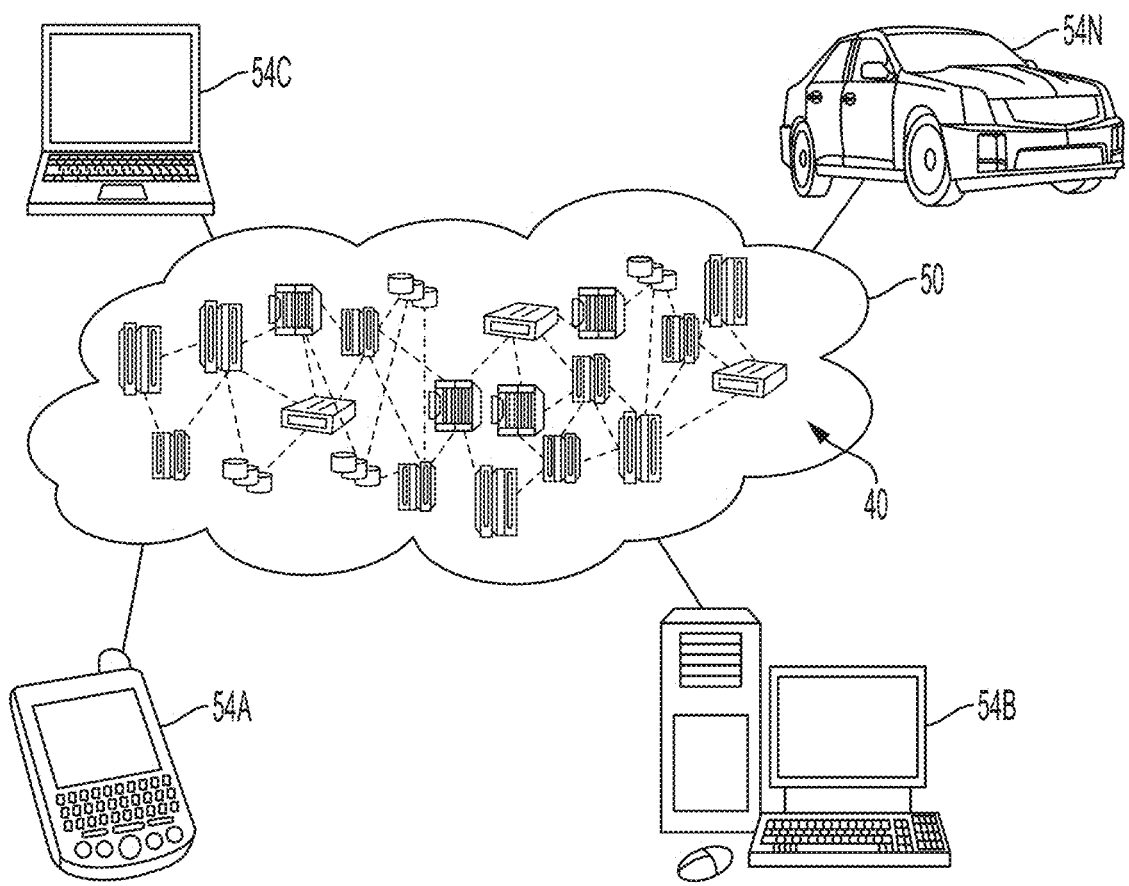
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 40 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
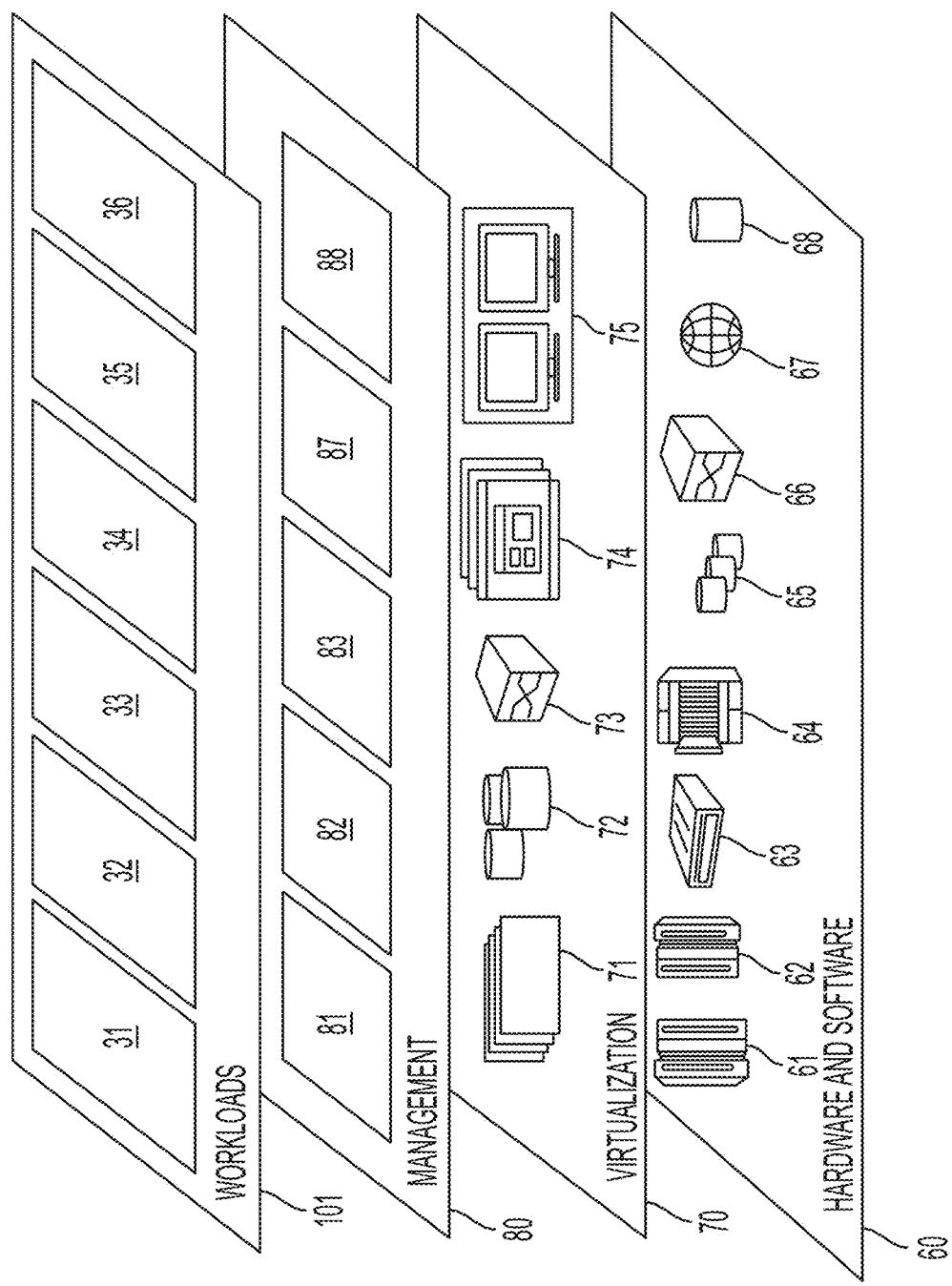
FIG. 8 depicts abstraction model layers, in accordance with embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 30 provides examples of functionality for which the cloud computing environment may be utilized. Examples of workloads and functions which may be provided from this layer include: mapping and navigation 31; software development and lifecycle management 32; virtual classroom education delivery 33; data analytics processing 34; transaction processing 35; and transmission of an ACK in response to receipt of a data packet in RLC AM mode operation in a 5G communication protocol stack 36.

Examples and embodiments of the present invention described herein have been presented for illustrative purposes and should not be construed to be exhaustive. While embodiments of the present invention have been described herein for purposes of illustration, many modifications and changes will become apparent to those skilled in the art. The description of the present invention herein explains the principles underlying these examples and embodiments, in order to illustrate practical applications and technical improvements of the present invention over known technologies, computer systems, and/or products.

What is claimed is:

1. A method for transmitting an ACK in response to receipt of a data packet in Radio Link Control (RLC) Acknowledge Mode (AM) mode operation in a 5G communication protocol stack, said method comprising:
   receiving, by a first RLC entity from a receiving user equipment (UE) corresponding to the first RLC entity within operation in the 5G communication protocol stack: (i) an ACK to be sent to a transmitting UE in response to the receiving UE having received a data packet from the transmitting UE, (ii) a first RLC channel extracted by the receiving UE from a header of the data packet, and (iii) an identifier (ID) of the transmitting UE extracted by the receiving UE from the header of the data packet, said receiving RLC configured to send the ACK to the transmitting UE via the extracted first RLC channel;
   said first RLC entity sending a first query to an Evolved Node B (eNodeB), said first query querying the enodeB as to whether the first RLC channel is congested, said first RLC channel operating in a RLC Acknowledge Mode (AM) mode within the 5G architecture, said receiving UE and said transmitting UE being communicatively coupled to the eNodeB;
   after said sending the first query, said first RLC entity receiving a first communication from the eNodeB specifying that the first RLC channel is congested;
   in response to said received first communication having specified that the first RLC channel is congested, said first RLC entity selecting from an AM mode RLC channel list stored at the receiving UE, a second, different RLC channel: (i) operating in the RLC AM mode, (ii) corresponding to the extracted ID of the transmitting UE, and (iii) specified as not being congested in a second communication received by the receiving RLC from the eNodeB in response to a second query sent by the second RLC to the eNodeB as to whether the second RLC channel is congested; and
   said first RLC entity sending the ACK to the transmitting UE via the second RLC channel instead of via the first RLC channel.

2. The method of claim 1, said method further comprising:
   said first RLC entity generating the AM mode RLC channel list via: detecting a current active mode of each RLC channel listed at the receiving UE; and adding, to the AM mode RLC channel list, each RLC channel whose current active mode is detected to be the AM mode.

3. The method of claim 2, wherein said detecting the current active mode of each RLC channel comprises collecting each RLC channel's current active mode for each Detailed Traffic Channel (DTCH) connected to the eNodeB.

4. The method of claim 1, wherein the first RLC channel is congested due to at least one interface of a Medium Access Control (MAC) physical interface and a Radio Access Network (RAN) interface being bottlenecked with resource congestion, as detected by a first polling thread running at the MAC interface and second polling thread running at the RAN interface.

5. The method of claim 1, wherein the data packet was sent to the receiving UE by an application at the transmitting UE, and wherein the second RLC channel is specific to the application.

6. The method of claim 5, said method further comprising:
   extracting an identity of the application from the header of the data packet to maintain privacy and security constraints pertaining to the application.

7. The method of claim 1, said method further comprising:
   said first RLC entity detecting a mode of the RLC channel being the AM mode and in response, said first RLC entity collecting all RLC channels having active AM mode tuning for communication exchanged between the first UE and the second UE.

8. A computer program product, comprising one or more computer readable hardware storage devices having computer readable program code stored therein, said program code containing instructions executable by one or more processors of a computer system to implement a method for transmitting an ACK in response to receipt of a data packet in Radio Link Control (RLC) Acknowledge Mode (AM) mode operation in a 5G communication protocol stack, said method comprising:
   receiving, by a first RLC entity from a receiving user equipment (UE) corresponding to the first RLC entity within operation in the 5G communication protocol stack: (i) an ACK to be sent to a transmitting UE in response to the receiving UE having received a data packet from the transmitting UE, (ii) a first RLC channel extracted by the receiving UE from a header of the data packet, and (iii) an identifier (ID) of the transmitting UE extracted by the receiving UE from the header of the data packet, said receiving RLC configured to send the ACK to the transmitting UE via the extracted first RLC channel;

said first RLC entity sending a first query to an Evolved Node B (eNodeB), said first query querying the enodeB as to whether the first RLC channel is congested, said first RLC channel operating in a RLC Acknowledge Mode (AM) mode within the 5G architecture, said receiving UE and said transmitting UE being communicatively coupled to the eNodeB;

after said sending the first query, said first RLC entity receiving a first communication from the eNodeB specifying that the first RLC channel is congested;

in response to said received first communication having specified that the first RLC channel is congested, said first RLC entity selecting from an AM mode RLC channel list stored at the receiving UE, a second, different RLC channel: (i) operating in the RLC AM mode, (ii) corresponding to the extracted ID of the transmitting UE, and (iii) specified as not being congested in a second communication received by the receiving RLC from the eNodeB in response to a second query sent by the second RLC to the eNodeB as to whether the second RLC channel is congested; and said first RLC entity sending the ACK to the transmitting UE via the second RLC channel instead of via the first RLC channel.

9. The computer program product of claim 8, said method further comprising:
said first RLC entity generating the AM mode RLC channel list via: detecting a current active mode of each RLC channel listed at the receiving UE; and adding, to the AM mode RLC channel list, each RLC channel whose current active mode is detected to be the AM mode.

10. The computer program product of claim 9, wherein said detecting the current active mode of each RLC channel comprises collecting each RLC channel's current active mode for each Detailed Traffic Channel (DTCH) connected to the eNodeB.

11. The computer program product of claim 8, wherein the first RLC channel is congested due to at least one interface of a Medium Access Control (MAC) physical interface and a Radio Access Network (RAN) interface being bottlenecked with resource congestion, as detected by a first polling thread running at the MAC interface and second polling thread running at the RAN interface.

12. The computer program product of claim 8, wherein the data packet was sent to the receiving UE by an application at the transmitting UE, and wherein the second RLC channel is specific to the application.

13. The computer program product of claim 12, said method further comprising:
extracting an identity of the application from the header of the data packet to maintain privacy and security constraints pertaining to the application.

14. The computer program product of claim 8, said method further comprising:
said first RLC entity detecting a mode of the RLC channel being the AM mode and in response, said first RLC entity collecting all RLC channels having active AM mode tuning for communication exchanged between the first UE and the second UE.

15. A computer system, comprising one or more processors, one or more memories, and one or more computer readable hardware storage devices, said one or more hardware storage devices containing program code executable by the one or more processors via the one or more memories to implement a method for transmitting an ACK in response to receipt of a data packet in Radio Link Control (RLC) Acknowledge Mode (AM) mode operation in a 5G communication protocol stack, said method comprising:

receiving, by a first RLC entity from a receiving user equipment (UE) corresponding to the first RLC entity within operation in the 5G communication protocol stack: (i) an ACK to be sent to a transmitting UE in response to the receiving UE having received a data packet from the transmitting UE, (ii) a first RLC channel extracted by the receiving UE from a header of the data packet, and (iii) an identifier (ID) of the transmitting UE extracted by the receiving UE from the header of the data packet, said receiving RLC configured to send the ACK to the transmitting UE via the extracted first RLC channel;

said first RLC entity sending a first query to an Evolved Node B (eNodeB), said first query querying the enodeB as to whether the first RLC channel is congested, said first RLC channel operating in a RLC Acknowledge Mode (AM) mode within the 5G architecture, said receiving UE and said transmitting UE being communicatively coupled to the eNodeB;

after said sending the first query, said first RLC entity receiving a first communication from the eNodeB specifying that the first RLC channel is congested;

in response to said received first communication having specified that the first RLC channel is congested, said first RLC entity selecting from an AM mode RLC channel list stored at the receiving UE, a second, different RLC channel: (i) operating in the RLC AM mode, (ii) corresponding to the extracted ID of the transmitting UE, and (iii) specified as not being congested in a second communication received by the receiving RLC from the eNodeB in response to a second query sent by the second RLC to the eNodeB as to whether the second RLC channel is congested; and said first RLC entity sending the ACK to the transmitting UE via the second RLC channel instead of via the first RLC channel.

16. The computer system of claim 15, said method further comprising:
said first RLC entity generating the AM mode RLC channel list via: detecting a current active mode of each RLC channel listed at the receiving UE; and adding, to the AM mode RLC channel list, each RLC channel whose current active mode is detected to be the AM mode.

17. The computer system of claim 16, wherein said detecting the current active mode of each RLC channel comprises collecting each RLC channel's current active mode for each Detailed Traffic Channel (DTCH) connected to the eNodeB.

18. The computer system of claim 15, wherein the first RLC channel is congested due to at least one interface of a Medium Access Control (MAC) physical interface and a Radio Access Network (RAN) interface being bottlenecked with resource congestion, as detected by a first polling thread running at the MAC interface and second polling thread running at the RAN interface.

19. The computer system of claim 15, wherein the data packet was sent to the receiving UE by an application at the transmitting UE, and wherein the second RLC channel is specific to the application.

20. The computer system of claim 19, said method further comprising:

extracting an identity of the application from the header of the data packet to maintain privacy and security constraints pertaining to the application.

\* \* \* \* \*